United States Patent [19]

Witting

[11] Patent Number: 4,982,140

[45] Date of Patent: Jan. 1, 1991

[54] STARTING AID FOR AN ELECTRODELESS HIGH INTENSITY DISCHARGE LAMP

[75] Inventor: Harald L. Witting, Burnt Hills, N.Y.

[73] Assignee: General Electric Company, Schenectady, N.Y.

[21] Appl. No.: 417,404

[22] Filed: Oct. 5, 1989

[51] Int. Cl.⁵ .......................................... H05B 41/24
[52] U.S. Cl. ............................... 315/248; 315/111.51; 315/39; 313/151
[58] Field of Search .................... 315/248, 267, 111.51, 315/344, 224, 241 R, 39; 313/153, 146, 151, 607, 608

[56] References Cited

U.S. PATENT DOCUMENTS

| | | | |
|---|---|---|---|
| 4,298,828 | 11/1981 | Justice | 315/248 |
| 4,812,702 | 3/1989 | Anderson | 315/344 |
| 4,890,042 | 12/1989 | Witting | 315/248 |
| 4,894,589 | 1/1990 | Witting | 315/248 |
| 4,894,590 | 1/1990 | Witting | 315/248 |
| 4,894,591 | 1/1990 | Witting | 315/248 |
| 4,902,937 | 2/1990 | Witting | 315/248 |

Primary Examiner—Eugene R. LaRoche
Assistant Examiner—Amir Zarabian
Attorney, Agent, or Firm—Jill M. Breedlove; James C. Davis, Jr.; Marvin Snyder

[57] ABSTRACT

A starting aid for an electrodeless high intensity discharge lamp comprises a first conductive coil disposed about a second conductive coil, the coils each having a truncated-cone shape. The coils are wound in opposite directions so that voltages induced therein add together to provide a sufficiently high electric field gradient to initiate a plasma discharge in the arc tube. The coils are movable between a starting position adjacent to the arc tube and a lamp-operating position at a predetermined location away from the arc tube.

11 Claims, 3 Drawing Sheets

STARTING AID FOR AN ELECTRODELESS HIGH INTENSITY DISCHARGE LAMP

FIELD OF THE INVENTION

The present invention relates generally to a class of high intensity discharge lamps for which the arc discharge is generated by a solenoidal electric field, i.e. HID-SEF lamps. More particularly, this invention relates to a starting aid for initiating a plasma discharge within the arc tube of an HID-SEF lamp.

BACKGROUND OF THE INVENTION

In a high intensity discharge (HID) lamp, a medium-to-high pressure ionizable gas, such as mercury or sodium vapor, emits visible radiation upon excitation typically caused by passage of current through the gas. In the original class of HID lamps, discharge current was caused to flow between two electrodes. However, a major cause of early electroded HID lamp failure has been found attributable to at least two inherent operational characteristics of such lamps. First, during lamp operation, sputtering of electrode material onto the lamp envelope is common and impedes optical output. Second, thermal and electrical stresses often result in electrode failure.

Electrodeless HID lamps do not exhibit these life shortening phenomena found in electroded HID lamps. One class of electrodeless HID lamps involves generating an arc discharge by establishing a solenoidal electric field in the gas; and, hence, these lamps are referred to as HID-SEF lamps. In particular, a solenoidal electric field is created by the varying magnetic field of an excitation coil. Disadvantageously, it is difficult to develop a sufficiently high electric field gradient especially in the associated excitation coil, because the coil current may need to be prohibitively high, even if the current is provided in the form of pulses. Furthermore, providing a sufficiently high electric field gradient may be impossible, because the necessary voltage-per-turn of a particular excitation coil may exceed the turn-to-turn electrical breakdown voltage thereof.

Capacitive starting electrodes for HID-SEF lamps are described in commonly assigned, copending U.S. patent application of H.L. Witting, Ser. No. 225,315, filed on July 28, 1988, which is hereby incorporated by reference. A pair of starting electrodes, each comprising a conductive ring, is adjacent to the lamp envelope surrounding the arc tube and connected to the excitation coil. Coupling a high voltage signal between the pair of starting electrodes causes an electric field to be produced therebetween, which is of sufficient magnitude to create a glow discharge in the arc tube due to the arc tube wall capacitance. Heat sensitive members, e.g. bimetallic strips, are utilized for moving the starting electrodes away from the arc tube after initiating a plasma discharge, thereby extending the useful life of the lamp.

A spiral starting electrode for an HID-SEF lamp is described in commonly assigned, copending U.S. patent application of H.L. Witting, Ser. No. 226,584, filed on Aug. 1, 1988, which is hereby incorporated by reference. A single, conical-spiral-shaped starting electrode is positioned so that its narrower end is adjacent to, or on, the arc tube surface. The wider end of the starting electrode is positioned so that flux generated by the excitation coil cuts the turns of the spiral electrode, thereby generating a high-voltage signal which results in a sufficiently high electric field gradient to create a glow discharge in the arc tube. Preferably, a bimetallic strip is utilized to move the starting electrode away from the arc tube after a plasma discharge is initiated therein.

A pair of starting electrodes which are moved from a rest position to a starting location adjacent to the arc tube by piezoelectric means is described in commonly assigned, copending U.S. patent application of J.C. Borowiec, Ser. No. 229,187, filed on Aug. 8, 1988, which is hereby incorporated by reference. The piezoelectric means are inactivated after a plasma discharge is initiated, and the starting electrodes are moved back to the rest position. Advantageously, the piezoelectric means allows the selective movement of the starting electrodes, thereby enabling the lamp to be restarted, if necessary, even if the arc tube is still hot.

Another approach to initiating a plasma discharge within the arc tube of an HID-SEF lamp is described in commonly assigned, copending U.S. patent application of H.L. Witting, Ser. No. 240,331, filed on Sept. 6, 1988, which is hereby incorporated by reference. In particular, an excitation coil has first and second substantially cone-shaped, solenoidally wound coil portions. The narrow end of each coil portion is adjacent to the arc tube. At any instant, the magnetic fields produced by each of the two coil portions combine in an in-phase manner to produce a sufficiently high electric field across the arc tube to initiate and maintain a plasma discharge therein.

OBJECTS OF THE INVENTION

One object of the present invention is to provide a new and improved starting aid for an electrodeless HID-SEF lamp.

Another object of the present invention is to provide a starting aid for an electrodeless HID-SEF lamp that does not require electrical connections to the associated lamp power circuit.

Still another object of the present invention is to provide a starting aid for an electrodeless HID-SEF lamp which includes means for moving the starting aid between a starting position and a lamp-operating position in order to extend useful lamp life.

SUMMARY OF THE INVENTION

The foregoing and other objects are attained in a new and improved starting aid for an electrodeless HID-SEF lamp of the type having an excitation coil positioned about an arc tube wherein a plasma discharge is excited. The new starting aid comprises a first solenoidal conductive coil situated about a second solenoidal conductive coil, the coils being wound in opposite directions. In the preferred embodiment, the starting aid conductive coils are each of a truncated-cone shape, each coil being arranged as on the surface of an imaginary cone having a vertex and conical surface elements extending therefrom at a vertex angle with respect to the axis of the imaginary cone. Preferably, the starting aid coils have different vertex angles so that their narrow ends are spaced apart from each other. The wide ends of the starting aid coils are connected to each and other and to a support within the HID-SEF lamp.

Upon application of a radio frequency (RF) signal to the excitation coil, the resultant magnetic flux induces a high voltage in the turns of each starting aid coil. Since the starting aid coils are wound in opposite directions, the induced voltages add, thereby providing a sufficiently high electric field to create a glow discharge in the arc tube which quickly transitions to a plasma discharge.

The preferred embodiment also comprises means for moving the first and second starting aid conductive coils between a starting position and a lamp-operating position in order to reduce light blockage during lamp operation and to extend the useful life of the lamp.

BRIEF DESCRIPTION OF THE DRAWINGS

The features and advantages of the present invention will become apparent from the following Detailed Description of the Invention when read with the accompanying drawings in which.

DETAILED DESCRIPTION OF THE INVENTION

Figure 1:
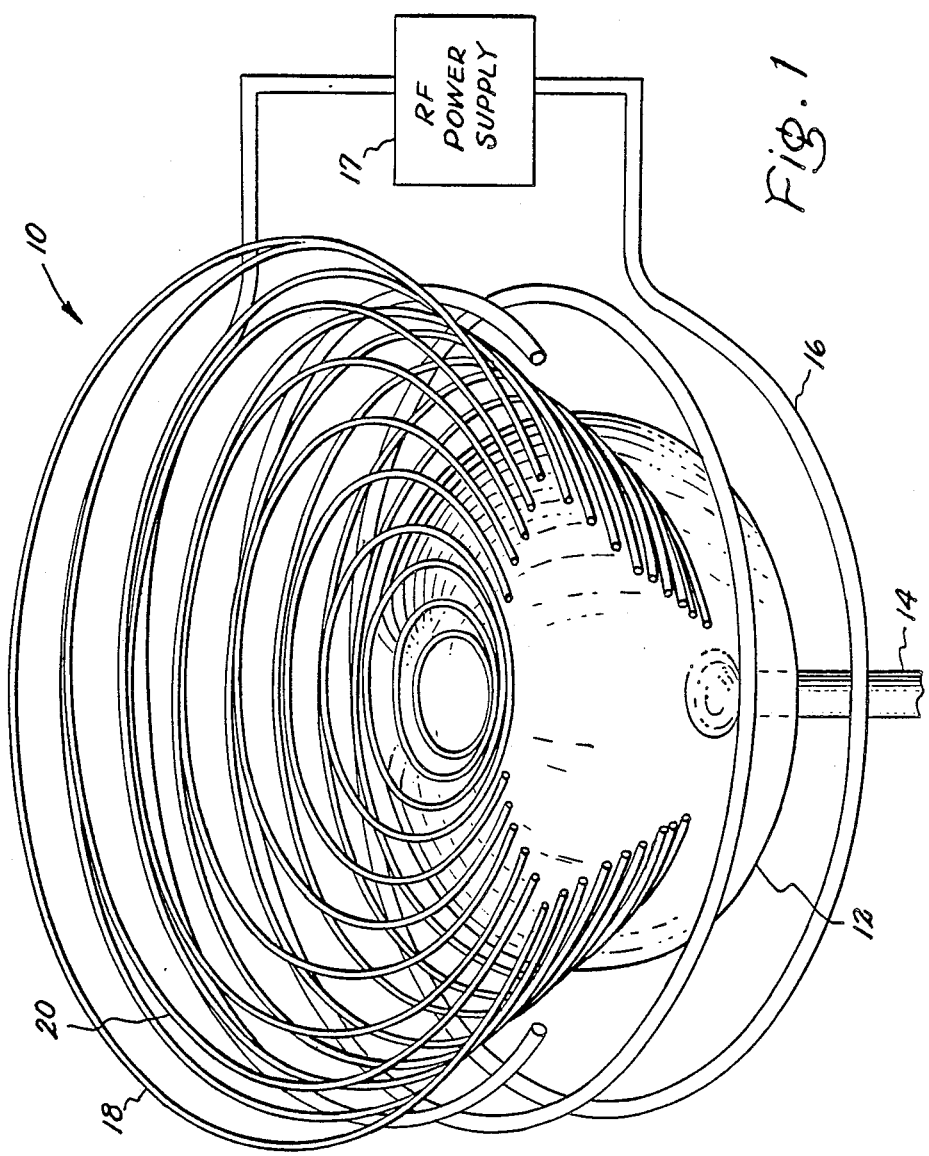
FIG. 1 is a partially cutaway, three-dimensional view of an electrodeless HID-SEF lamp employing a starting aid in accordance with a preferred embodiment of the present invention.

FIG. 1 illustrates an HID-SEF lamp including a starting aid 10 according to one embodiment of the present invention. The HID-SEF lamp includes an arc tube 12 for containing a gaseous fill. As illustrated, arc tube 12 preferably has a substantially ellipsoid shape. Such a structure enables relatively isothermal operation, thus allowing the vapor pressures of the ingredients comprising the fill to reach the required levels without overheating the lamp. The arc tube is preferably formed of a high temperature glass, such as fused quartz, or an optically transparent ceramic, such as polycrystalline alumina. Arc tube 12 is supported by a rod 14 made of quartz, for example.

Electrical power is supplied to the HID-SEF lamp by an excitation coil 16 disposed about arc tube 12 and connected to a radio frequency (RF) power supply 17. In operation, RF current in coil 16 results in a changing magnetic field which produces within arc tube 12 an electric field that completely closes upon itself. Current flows through the fill within arc tube 12 as a result of a sufficiently high solenoidal electric field, producing a toroidal discharge in the arc tube. A suitable arc tube fill comprises sodium iodide and cerium halide with either krypton or argon as a starting gas, as described in commonly assigned, copending U.S. patent application of H.L. Witting, Ser. No. 202,737, filed June 3, 1988, now allowed, which is hereby incorporated by reference. In the preferred embodiment, operating frequencies of the RF power supply are in the range from 1 megahertz to 30 megahertz, an exemplary operating frequency being 13.56 megahertz.

As illustrated in FIG. 1, a first preferred embodiment of starting aid 10 comprises first and second conductive coils 18 and 20, respectively, each of a substantially truncated-cone shape. In particular, each coil is arranged on the surface of an imaginary cone having a vertex and conical surface elements extending therefrom at a vertex angle with respect to the axis of the imaginary cone. First coil 18 is disposed about second coil 20 so that their axes coincide. The wide ends of coils 18 and 20 are connected together. The narrow ends are preferably in contact with arc tube 12 so that the imaginary vertices would be located in the interior of the arc tube. Furthermore, a desirable starting aid configuration comprises coils having different vertex angles, such that the narrow ends of coils 18 and 20 are thus spaced apart from each other.

In operation, upon application of an RF current to excitation coil 16, the resultant changing magnetic field induces a relatively high RF voltage across the turns of each starting aid coil 18 and 20, respectively. This voltage gradient results in an electric field extending within the arc tube, thus producing a glow discharge therein. When the density of the glow discharge increases such that the resistivity thereof is sufficiently low to enable the discharge to accept significant power input from the solenoidal electric field produced by the coil, a transition from a low-current glow discharge to a high-current glow discharge is made, thus completing the lamp starting process.

Figure 2A:
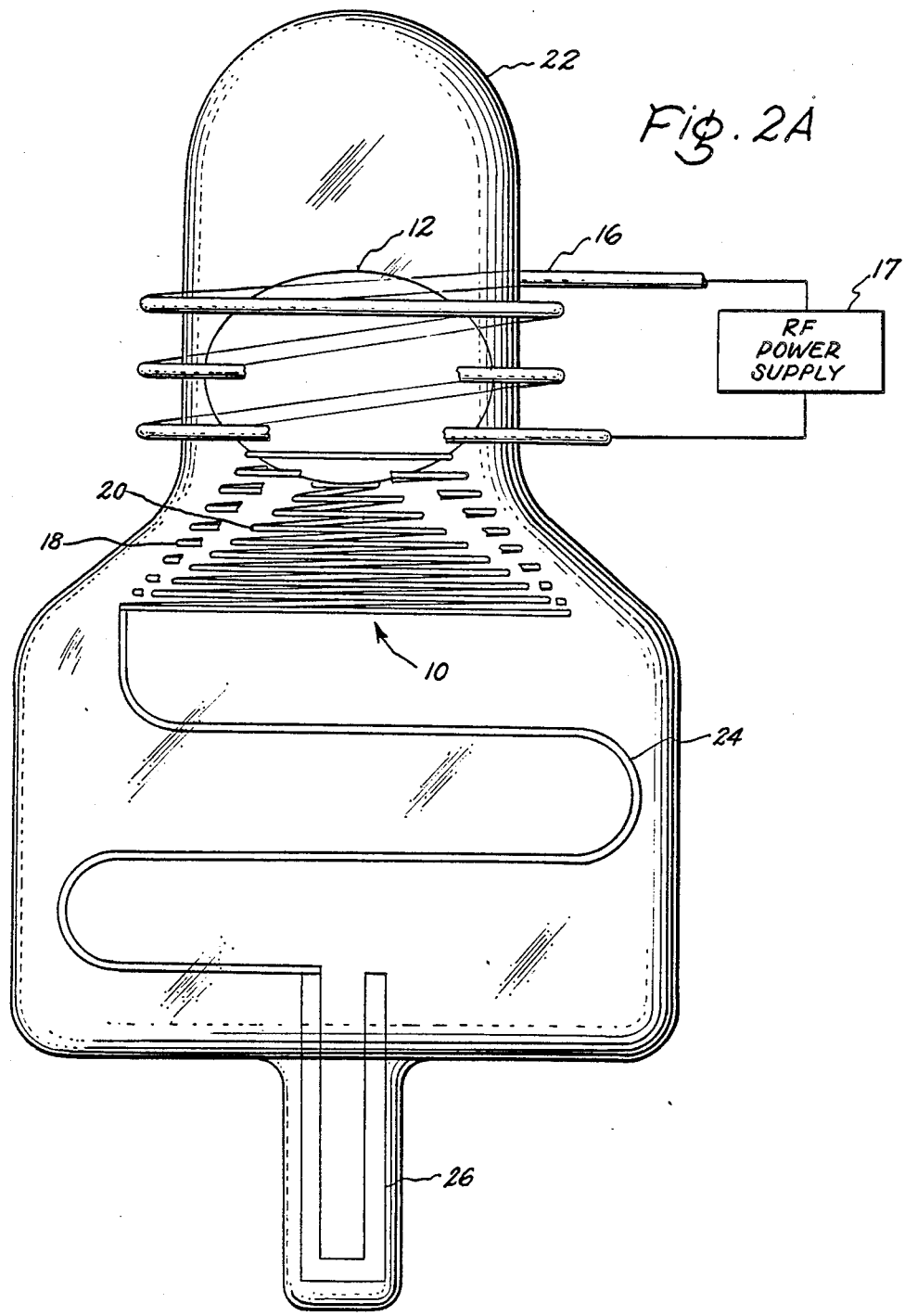
FIG. 2A is a side view of a preferred embodiment of the starting aid of the present invention in a lamp-starting position.
Figure 2B:
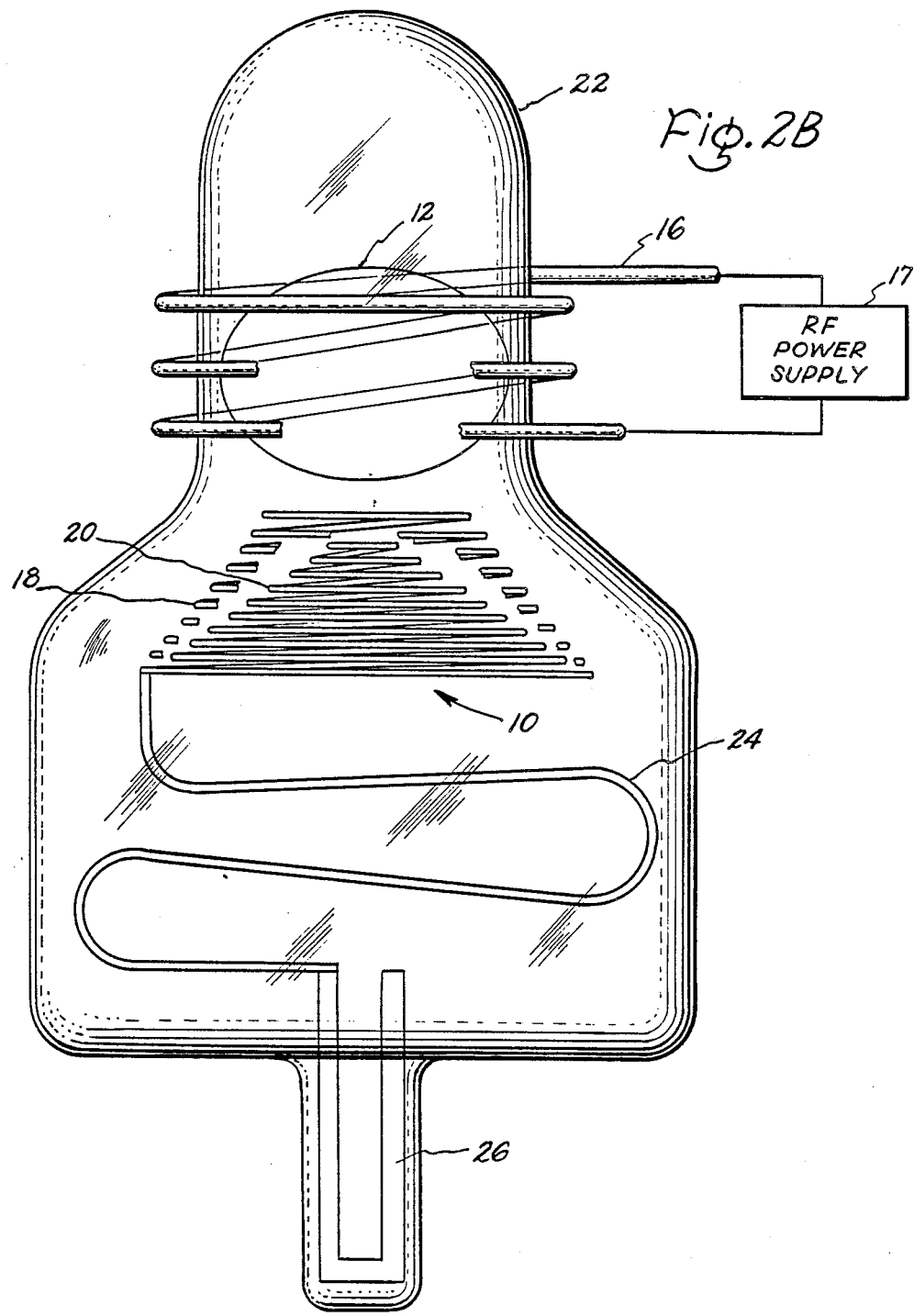
FIG. 2B is a side view of a preferred embodiment of the starting aid of the present invention in a lamp-operating position.

A second preferred embodiment of the present invention is illustrated in FIGS. 2A and 2B. In this embodiment, arc tube 12 and starting aid 10 are enclosed within an outer envelope 22 which serves to: reduce heat loss from the arc tube; absorb ultraviolet radiation; and protect the arc tube from harmful contamination. As shown, starting aid 10 is attached to a support 24. Preferably, support 24 comprises means responsive to thermal energy for moving starting aid 10 away from arc tube 12 once the starting process is completed. One preferred embodiment of support 24 comprises a heat-sensitive, e.g. bimetallic, strip. As illustrated in FIGS. 2A and 2B, bimetallic support 24 is attached to outer envelope 22 by a metal fixture 26 that also serves to hold arc tube 12 in place.

FIG. 2A shows bimetallic support 24 holding starting aid 10 in the starting position, i.e. in contact with arc tube 12. After the lamp has started, the heat from arc tube 12 causes bimetallic support 24 to undergo differential expansion and bend in such a way as to move the starting aid away from the arc tube to the lamp-operating position as shown in FIG. 2B. As a result, light blockage during lamp operation is reduced, and arc tube life is extended. After the lamp is turned off and the arc tube temperature has decreased sufficiently, bimetallic support 24 moves back to the starting position. An exemplary bimetallic strip 24 comprises a 7 milli-inch thick bimetal foil available as catalog No. PMC223-1 from Polymetallurgical Corporation of Attleboro Falls, Mass.

An HID-SEF lamp having a four-turn excitation coil and containing a fill of approximately 2.0 milligrams of NaI, 4.0 milligrams of $CeI_3$ and 250 torr partial pressure of krypton gas at room temperature was tested. The starting aid was comprised of 0.02 inch diameter platinum wire and had an outer diameter of 30 millimeters. Each conductive coil comprising the starting aid had six turns. The lamp repeatedly started at an input power level of 125 watts using a power supply that provided an initial power spike, and at 200 watts using a power supply that did not provide a power spike.

While the preferred embodiments of the present invention have been shown and described herein, it will be obvious that such embodiments are provided by way of example only. Numerous variations, changes, and substitutions will occur to those of skill in the art without departing from the invention herein. Accordingly, it is intended that the invention be limited only by the spirit and scope of the appended claims.

What is claimed is:

1. A starting aid for an electrodeless high intensity discharge lamp of the type having an excitation coil situated about an arc tube for exciting a plasma discharge therein upon application of a radio frequency signal to said excitation coil, comprising:

first and second solenoidal conductive coils, said first coil being situated about said second coil with the longitudinal axes of said first and second coils substantially coinciding;

said first and second coils being wound in opposite directions so that, upon application of said radio frequency signal to said excitation coil, a radio frequency voltage is induced in each of said first and second coils in a manner so as to add together to initiate the plasma discharge within said arc tube.

2. The starting aid of claim 1 wherein said first and second coils are each of a substantially truncated-cone shape having an imaginary vertex and conical surface elements extending therefrom at a vertex angle with respect to said axes, each said first and second coil having a narrow end and a wide end, the wide ends of said first and second coils being connected together.

3. The starting aid of claim 2 wherein the narrow ends of said first and second coils are spatially separated, the vertex angle of said first coil being greater than the vertex angle of said second coil.

4. The starting aid of claim 2 wherein the narrow ends of said first and second coils are in contact with the exterior surface of said arc tube, at least during initiation of a plasma discharge therein.

5. The starting aid of claim 4, further comprising coil moving means for moving said first and second coils to a predetermined location away from said arc tube after the plasma discharge is initiated.

6. The starting aid of claim 5 wherein said coil moving means comprises heat responsive means for moving said first and second coils to said predetermined location away from said arc tube upon receipt of heat energy therefrom, said heat responsive means moving said coils back toward said arc tube upon sufficient reduction in receipt of heat energy from said arc tube.

7. The starting aid of claim 6 wherein said heat responsive means comprises bimetallic support means.

8. The starting aid of claim 1 further comprising:

coil positioning means for positioning said first and second coils in a first location adjacent to the exterior surface of said arc tube during initiation of a plasma discharge and in a second location at a predetermined distance away from said arc tube after the plasma discharge is initiated.

9. The starting aid of claim 8 wherein said positioning means comprises coil moving means responsive to a stimulus for moving said first and second coils between said first and second locations.

10. The starting aid of claim 9 wherein said coil moving means comprises heat responsive means for moving said first and second coils to said second location upon receipt of heat energy from said arc tube, said heat responsive means moving said first and second coils back to said first location upon sufficient reduction in receipt of heat energy from said arc tube.

11. The starting aid of claim 10 wherein said heat responsive means comprises bimetallic support means.

* * * * *